June 15, 1943.   R. E. MOYER   2,321,765
TOOL MECHANISM FOR GEAR CUTTING MACHINES
Filed Oct. 18, 1940   2 Sheets-Sheet 1

Inventor
RICHARD E. MOYER
By B.W.Schlesinger
Attorney

Inventor
RICHARD E. MOYER

Patented June 15, 1943

2,321,765

UNITED STATES PATENT OFFICE 2,321,765

TOOL MECHANISM FOR GEAR-CUTTING MACHINES

Richard E. Moyer, Rochester, N. Y., assignor to Gleason Works, Rochester, N. Y., a corporation of New York Application October 18, 1940, Serial No. 361,758

3 Claims. (Cl. 29—97)

The present invention relates to tool mechanisms of machines for cutting gears and particularly to tool mechanisms of machines for rough-cutting straight tooth bevel gears.

In rough-cutting straight bevel gears, reciprocating planing tools are quite generally employed. For the more usual jobs, the tools used are of truncated V-shape. They have a tip cutting edge and opposite side cutting edges, and the opposite side cutting edges are inclined to one another at an angle equal approximately to the included angle between the opposite sides of tooth spaces of the gear to be cut. For the heavier pitches, tools of so-called corrugated form may be employed. Such tools have serrated side cutting edges and the opposite serrated side cutting edges are inclined to one another at an angle approximately equal to the angle included between the opposite side-surfaces of the tooth spaces to be cut.

In roughing a tooth space of a bevel gear with either of these two types of tools, the tool is reciprocated back and forth longitudinally of the tooth space and is simultaneously fed into depth until the tooth space has been cut to the desired depth. The tool cuts on its stroke in one direction only and is withdrawn slightly on its return stroke so that it does not drag in the cut. With either form of tool, the tool takes a cut on its two sides and on its tip simultaneously as it is fed into the work. The rate of feed of the tool into the blank on successive cutting strokes accordingly is limited by the necessity of avoiding overburdening of the tool. Due to the heavy thrust of cutting, moreover, there is a tendency for slight inaccuracies to arise in the tooth to tooth spacing of the roughed gear blank. Accordingly it is the practice to leave an appreciable amount of stock on the sides of the roughed teeth to be cleaned up in the finish cutting operation so that correct final tooth spacing may be obtained. This affects, of course, the speed of the finishing operation.

A primary object of this invention is to provide a planing tool mechanism which may be used for rough-cutting gears at higher speeds than heretofore employed and with which gears may be rough-cut closer to size.

A still further object of the invention is to provide a planing tool mechanism for rough-cutting gears which will have a longer life and cut more gears between sharpenings than the rough-cutting planing tools heretofore employed.

Other objects of the invention will be apparent hereinafter from the specification and from the recital of the appended claims.

The tool mechanism of the present invention has separate tip and side-cutting edges and these are arranged in tandem relation, one behind the other in the direction of cut. Thus the cuts in the bottom of a tooth space are separated from the cuts on the sides of the tooth space and these cuts are taken successively, not simultaneously. The tool mechanism has a slotting part and a side-cutting part. The slotting part projects in height beyond the side cutting part, and it is provided with side edges of smaller pressure angle than the corresponding side edges of the side cutting part. The slotting part may be made integral with the side cutting part, but preferably separate slotting and side cutting blades are used, and the two blades are mounted in the same tool block one behind the other so as to cut successively as the tool block is reciprocated to impart the cutting motions to the blades.

Because of the separation of the side and bottom cuts, the thrusts on the tool and the work at any instant is reduced as compared with the thrusts created where side and bottom cuts are being taken simultaneously. Hence the tool mechanism of the present invention can be operated at higher speeds than prior types of reciprocating planing tools. Further than this, since the thrusts are not so great, a greater amount of stock can be removed in the roughing operation without danger of errors in tooth spacing arising. Moreover, since the bottom and side cuts are separated from one another, the overheating of the blades at their tips, which is likely to occur where a tool is cutting upon its sides and on its tip simultaneously, is avoided. Tool mechanisms, made according to the present invention, therefore, will have a longer life and cut a greater number of gears between sharpenings than prior types of roughing planing tools.

The slotting part may precede the side cutting part of the tool mechanism, but preferably the side cutting part is arranged to precede the slotting part. This permits of making the tool mechanism so that both the side cutting and slotting blades can be backed up to insure a maximum of rigidity and strength. Where two separate blades are employed, it further permits of constructing the tool block, in which the two blades are mounted, so that the tool block itself will form a support behind the cutting portions of the blades to take up the cutting thrusts.

Where separate side and slotting blades are provided, they will preferably be mounted adjustably in the tool block so as to permit adjusting them independently in the direction of their heights. Thus, the amount that the slotting blade projects beyond the side cutting blade can be adjusted and, moreover, the blades may be adjusted relative to one another after sharpening to maintain the amount of this projection.

In a standard type machine for cutting straight bevel gears there are two tool slides provided, and, in the roughing operation, the tools, which are mounted upon the two slides, are simultaneously reciprocated to cut in two adjacent tooth spaces of the blank simultaneously to produce tooth slots which converge towards the cone apex of the blank. The tool mechanism of the present invention may, of course, be used directly as a substitute for standard planing tool mechanisms, namely, to rough-cut in two tooth slots simultaneously. In this case, there will be a slotting blade and a side cutting blade mounted on each tool slide and the two tool slides will be reciprocated simultaneously to effect the rough cutting operation.

A preferred embodiment of the invention is illustrated in the accompanying drawings in which.

Reference will now be had to the drawings for a more detailed description. 10 denotes the slide of a standard gear cutting machine, such as, for instance, the machine of the Carlsen United States application, Serial No. 300,025, filed October 18, 1939. Adjustably mounted on this slide is a tool block 11, and secured in slots 14 and 15, respectively, of this tool block are a pair of cutting blades 12 and 13.

Figures 1, 2:
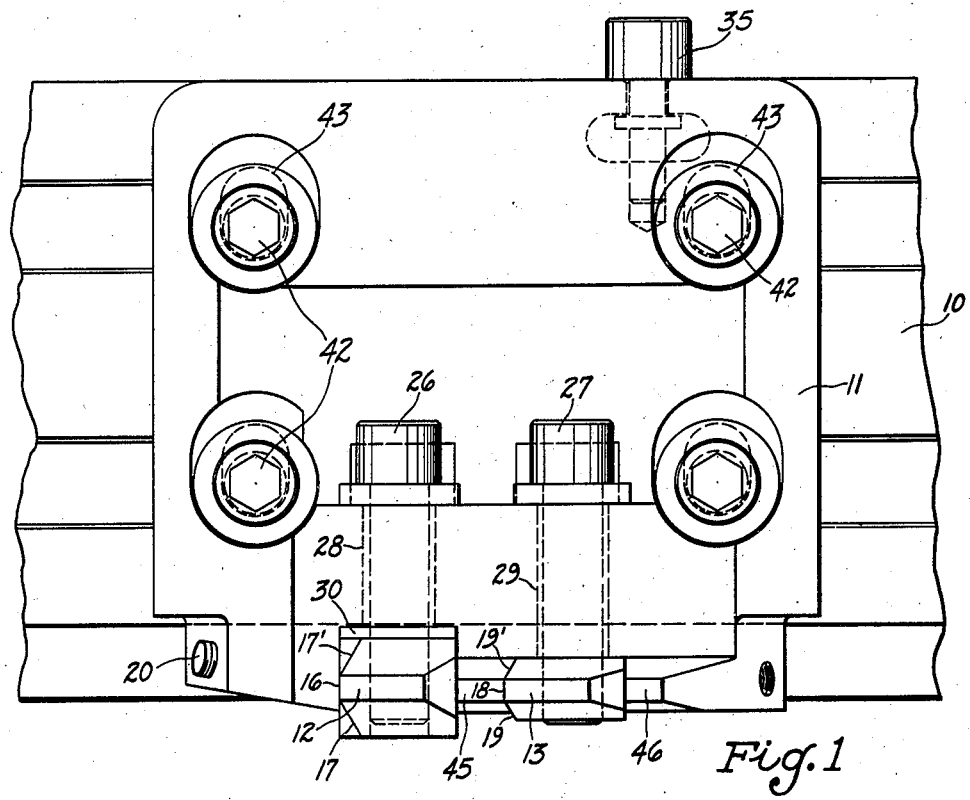
Fig. 1 is a fragmentary side elevation of the tool slide of a conventional type of straight bevel gear cutting machine, showing the tool mechanism of the present invention mounted thereon.
Fig. 2 is a fragmentary sectional view through the tool mechanism and slide.
Figure 3:
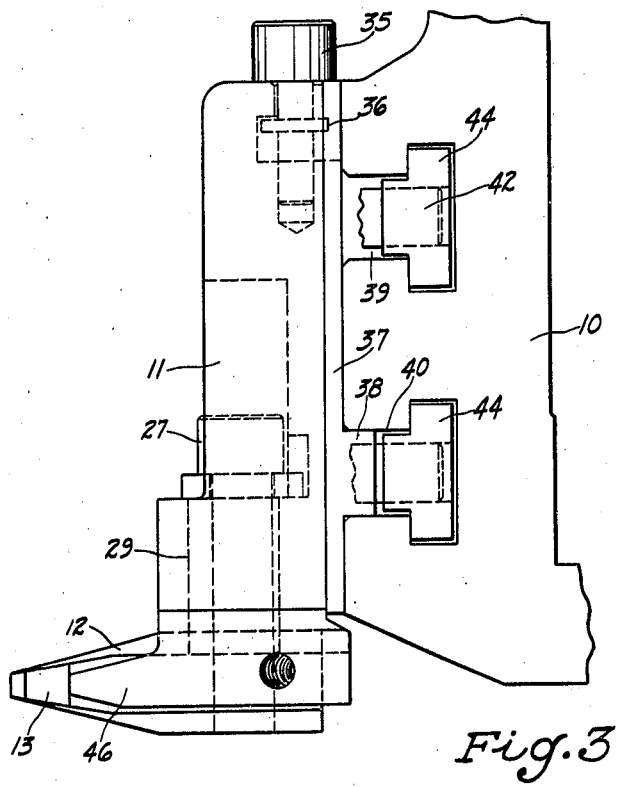
Fig. 3 is a fragmentary end view of the tool mechanism and slide.

The blade 12, which constitutes the side cutting blade of the set, is preferably mounted in the tool block so that, as shown, it precedes the slotting blade 13. The slotting blade 13 is mounted in the tool block so that it projects in height beyond the side cutting blade a distance $d$ (Figs. 2 and 4) which is greater than the distance which the tool mechanism is fed into the gear blank between the operation of the successive blades. The side cutting blade 12 has a tip cutting edge 16 and opposite side cutting edges 17 and 17', respectively. The slotting blade 13 has a tip cutting edge 18 and opposite side edges 19 and 19', respectively. Each of the blades is relieved on its sides and tip, back of its front face, and each of the blades is preferably provided with a hooked front face, as shown in Fig. 2. The hook enables the blade to take a clean cut on the both sides simultaneously. The side cutting blade 12 is hooked for the full amount of its effective cutting height, since the side cutting edges 17 and 17' of this blade cut for their full height. The hooked portion of the slotting blade need extend only a short distance down from the tip of this blade, however, as shown in Fig. 2, for the side edges of this blade cut only for the distance $d$ which the slotting blade projects beyond the side cutting blade plus the distance of feed of the tool mechanism into the work in a cutting stroke between operation of the two blades.

The side cutting blade 12 is preferably made with its side surfaces of greater positive pressure angle than the pressure angles of the corresponding side surfaces of the slotting tool 13, that is, the angle included between the sides of the blade 12 is greater than the angle included between the sides of the blade 13.

The two blades 12 and 13 are mounted in their respective slots 14 and 15 for individual adjustment in the direction of their heights. Adjustment of the blade 12 may be effected by threading up the screw 20 which threads into the tool block 11 and which has a conical head 21 that engages a chamfered corner 22 of the shank of the blade 12. Adjustment of the slotting blade 13 can be effected in a similar manner by rotation of the screw 24 which threads into the tool block 11 and which has a conical head 25 engaging the chamfered corner 26 of the shank of the blade 13. The blades 12 and 13 are secured in the tool block in any adjusted position by screws 26 and 27, respectively, which thread into the two tools and pass through elongated slots 28 and 29, respectively, formed in the tool block.

The point width of the side cutting blade 12 will be selected in accordance with the pitch of the gear to be roughed and the amount of stock which it is desired to leave on the gear for the finish-cutting operation. The slotting blade 13 may be made of any suitable point width. In the instance illustrated in Fig. 4, the point width of the slotting blade 13, that is the width of the blade at its tip 18, is slightly less than the point width of the side cutting blade 12. The point width of the slotting blade may, however, be made either greater or less than that shown, as compared with the point width of the side cutting blade. For gears of different pitches, side cutting tools of different point widths ordinarily will be employed. To assist in positioning a side cutting blade so that it is aligned with the slotting blade, shims of suitable thickness may be used. Thus shim 30 is used with the side-cutting blade 12 shown in the drawings in order to position this blade in correct alignment with the slotting blade 13. This shim is interposed between the top side of the blade 12 and the under side face of the slot 14 in which the blade 12 is mounted.

The tool block 11 is mounted on the slide 10 for lateral and longitudinal adjustment thereon in accordance with usual practice. For the purpose of the lateral adjustment, an adjusting screw 35 is provided. This screw threads into the tool block 11. It has a collar 36 which is seated in a kerf or recess formed in a plate 37. The plate 37 has a flat front face and is of substantially the same area as the tool block and it is mounted between the tool block and the slide 10. The plate 37 has a projection 38 formed on its rear face which engages in the lower one of the two T-slots 39 and 40 which are formed in the front face of the slide 10. The projection 38 serves to hold the plate 37 against lateral movement with reference to the slide 10. Hence when the adjusting screw 35 is rotated, the tool block 11 will be adjusted laterally on the plate 37, that is, laterally on the slide 10. The tool block 11 is secured to the slide 10, after adjustment, by four bolts 42. These bolts pass through elongated slots 43 in the tool block and they thread into the gibs or straps 44 which engage in the T-slots 39 and 40 of the slide 10. When the bolts 42 are loosed, the tool block can be adjusted longitudinally on the slide 10 by manually sliding it along the slide 10, and it can be adjusted laterally on the slide 10 by rotation of the screw 35.

By mounting the side-cutting blade 12 ahead of the slotting blade 13, a very rigid mounting of the two blades can be achieved. Thus an integral tongue or projection 45 may be formed on the tool block to back up the side cutting blade 12 for the greater portion of the height of that blade and likewise an integral tongue or lug 46 may be formed on the block to back up the blade 13 for the greater portion of the height of this latter blade. The two tongues 45 and 46 may be of general truncated V-shape corresponding to the shape of the two blades so that they will not interfere with the cutting operation of the tool mechanism.

If the side-cutting blade 12 were arranged to follow the slotting blade 13, no intermediate tongue 45 could be provided, for the side-cutting blade must cut for its full height. The slotting blade only has to cut for a small portion of its height and this permits of the provision of a tongue 45 on the tool block between the two blades to support and back up the side-cutting blade 12. There is another advantage to the construction shown in the drawings and that is that the whole tool block can be made more compact. If the side-cutting blade were to follow the slotting blade, then sufficient space would have to be left between the slotting blade and the side-cutting blade to provide chip clearance. If sufficient space were not allowed, the chips taken by the side-cutting blade would curl up and pack between the slotting and the side-cutting blades. Where the slotting blade follows the side-cutting blades, however, the chips taken by the side edges of the slotting blade are very small and do not pack. Hence the slotting blade can be mounted much closer to the side-cutting blade than would be the case were the position of these two blades reversed.

Figure 4:
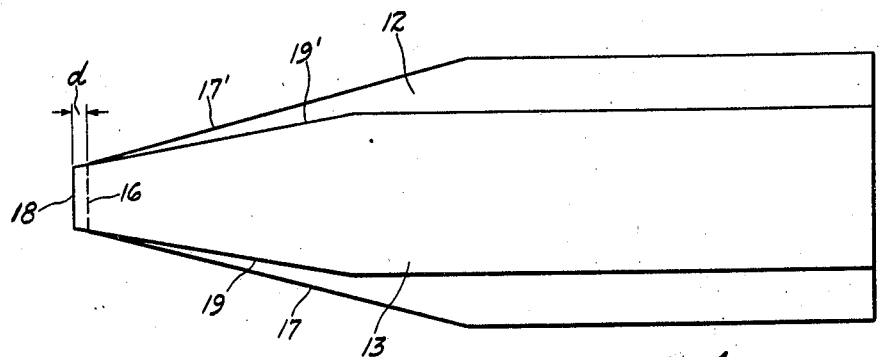
Fig. 4 is a diagrammatic view illustrating the relation of the side and slotting blades of the tool mechanism.

As already stated, ordinarily straight bevel gear cutting machines are provided with upper and lower tool slides, as illustrated in the Carlsen application, Serial No. 300,025 above referred to. Tool mechanisms constructed according to the present invention may be mounted on each one of these slides and the two slides actuated simultaneously to rough-cut two adjacent tooth spaces of a gear blank. During the cutting stroke of each slide, the slotting tool 13 always cuts deeper than the side cutting tool 12 because of the distance $d$ that the slotting blade projects beyond the side cutting blade. Hence the slotting blade relieves the side-cutting blade 12 of all or the greater part of tip cutting. When the slotting blade is made with a point width such as shown in Fig. 4, the side-cutting blade will do little or no cutting with its tip edge 16, but even when the slotting blade is made of less point width than shown in Fig. 4, the amount of tip cutting done by the side cutting blade will be very small and will not overburden that blade. The sides of the tooth slot are cut largely by the side cutting blade. The slotting blade cuts on its sides only for distance $d$ which it projects beyond the side-cutting blade plus the amount of feed between the operation of the two blades. No great burden of side-cutting is, therefore, placed on the slotting blade. The two blades divide the work of roughing out the tooth slot between them, therefore, and no great thrust or strain is placed on either blade. Hence the operation can proceed at high speed, as already stated.

The tool mechanism of this invention may be used for rough-cutting gears with or without generating roll as will be obvious to anyone skilled in the art. As will be also obvious to anyone skilled in the art, it is also possible to use a tool mechanism made according to this invention for finish-cutting, should it be desirable for any reason to take separate side and bottom cuts in a tooth space.

While the invention has been described in connection with a particular embodiment thereof it will be understood that it is capable of further modification and the present application is intended to cover any variations, uses, or adaptations of the invention following, in general, the principles of the invention and including such departures from the present disclosures as come within known or customary practice in the art to which the invention pertains and as may be applied to the essential features hereinbefore set forth and as fall within the scope of the invention or the limits of the appended claims.

Having thus described my invention, what I claim is:

1. A tool mechanism for gear cutting machines comprising a reciprocatory tool slide, a side-cutting part and a slotting part arranged on said slide one behind the other in the direction of reciprocation of said slide, said side-cutting part preceding the slotting part in the cutting direction, said slotting part projecting in height beyond the side-cutting part and having side edges of smaller positive pressure angle than the corresponding side edges of the side-cutting part.

2. A tool mechanism for a gear cutting machine, comprising a reciprocating tool slide, a tool block mounted thereon, and a pair of cutting blades mounted in said block one behind the other in the direction of movement of the slide, the rear blade projecting in height beyond the front blade and having side edges of smaller pressure angle than the corresponding side edges of the front blade, each of the blades being relieved on its sides and tip back of its front face, said tool block being provided with slots to receive said blades and being formed with projecting portions behind both blades which support and back up each of said blades for the greater part of the distance which the blades project beyond said block.

3. A tool mechanism for a gear cutting machine, comprising a reciprocating tool slide, a tool block mounted thereon, and a pair of cutting blades mounted in said block one behind the other in the direction of movement of the slide, the rear blade projecting in height beyond the front blade and having side edges of smaller positive pressure angle than the corresponding side edges of the front blade, each of said blades being relieved on its side and tip back of its front face, said tool block being formed with slots to receive said blades and being provided with projecting portions behind both said blades which support and back up said blades for the greater portion of the distance which the blades project beyond said block, means for adjusting each of the blades in its slot in the direction of its height, and means for securing the blades in their slots.

RICHARD E. MOYER.